US009510655B2

(12) United States Patent
Stratton

(10) Patent No.: US 9,510,655 B2
(45) Date of Patent: Dec. 6, 2016

(54) REMOVABLE MAGNETIC LANYARD FOR HOLDING OR HANGING AN ELECTRONIC DEVICE

(71) Applicant: Daniel John Stratton, Grapevine, TX (US)

(72) Inventor: Daniel John Stratton, Grapevine, TX (US)

(73) Assignee: Daniel John Stratton, Grapevine, TX (US)

( * ) Notice: Subject to any disclaimer, the term of this patent is extended or adjusted under 35 U.S.C. 154(b) by 0 days.

(21) Appl. No.: 14/612,497

(22) Filed: Feb. 3, 2015

(65) Prior Publication Data

US 2015/0216276 A1 Aug. 6, 2015

Related U.S. Application Data

(60) Provisional application No. 61/935,231, filed on Feb. 3, 2014.

(51) Int. Cl.

| | |
|---|---|
| ***G06K 7/00*** | (2006.01) |
| ***A45C 11/00*** | (2006.01) |
| ***A45F 5/02*** | (2006.01) |
| ***A45C 13/10*** | (2006.01) |
| ***H01F 7/02*** | (2006.01) |

(52) U.S. Cl.
CPC ........... *A45C 11/00* (2013.01); *A45C 13/1069* (2013.01); *A45F 5/02* (2013.01); *A45F 5/021* (2013.01); *H01F 7/0263* (2013.01); *A45C 2011/002* (2013.01); *A45F 2200/0516* (2013.01)

(58) Field of Classification Search
CPC . A45C 13/1069; A45C 13/1076; A45C 13/30; A45C 2011/001; A45F 2005/006; A45F 2200/0508; A45F 2200/0516
See application file for complete search history.

(56) References Cited

U.S. PATENT DOCUMENTS

| | | | | |
|---|---|---|---|---|
| 3,741,376 | A | 6/1973 | Brown et al. | |
| 8,328,055 | B1 * | 12/2012 | Snyder | A45F 5/00 224/197 |
| 8,899,458 | B1 * | 12/2014 | Heien | A45F 5/021 224/236 |
| 2003/0188815 | A1 * | 10/2003 | Hart | 150/147 |
| 2007/0215663 | A1 * | 9/2007 | Chongson et al. | 224/930 |
| 2010/0032462 | A1 * | 2/2010 | Cameron et al. | 224/222 |
| 2011/0280499 | A1 * | 11/2011 | Brundage | 383/11 |
| 2016/0003269 | A1 * | 1/2016 | Russell-Clarke | A41F 1/002 24/303 |

* cited by examiner

*Primary Examiner* — Thien M Le
*Assistant Examiner* — Asifa Habib
(74) *Attorney, Agent, or Firm* — McGinn IP Law Group, PLLC

(57) ABSTRACT

A device for securing and protecting an item, including a strap comprising a flexible material including a first magnet disposed at a distal end of the strap, and a second magnet disposed at a proximal end of the strap, a casing for securing and protecting the item including a pouch formed in the case having an opening, a screen disposed on a front side of the casing for viewing the item inside the casing, and a border disposed between an edge of the mesh pocket and the screen that surrounds an entirety of the screen, and a connecting region disposed between the distal end of the strap and the casing for securing the strap to the casing.

12 Claims, 7 Drawing Sheets

REMOVABLE MAGNETIC LANYARD FOR HOLDING OR HANGING AN ELECTRONIC DEVICE

This Application claims priority from U.S. Provisional Application No. 61/935,231, entitled REMOVABLE MAGNETIC LANYARD FOR HOLDING OR HANGING AN ELECTRONIC DEVICE, which was filed on Feb. 3, 2014, and is incorporated herein by reference.

BACKGROUND OF THE INVENTION

Field of the Invention

The present invention relates generally to an apparatus for carrying electronics. More specifically, the present invention is a lanyard that attaches to the clothing with magnetic material and holds an electronic device.

Description of the Related Art

Since electronic devices have become more and more portable, companies seem to continue making the same hands-free cases for them and not innovating more practical was of carrying these electronic devices. Conventional solutions include armbands, belt clips, pockets, attachable pockets, and the list goes on; however, there is no case that will comfortably secure electronic devices such as a smart phones, mp3 players, insulin pumps, and credit cards while at the same time protecting the device and not destroying magnetically sensitive items.

Pockets:

Though there are a myriad of products on the market, most all people still rely on their front pocket, a testament to the frustration consumers harbor towards the inadequacy of current products on the market; however, a great deal of current apparel, especially fitness apparel, does not come with pockets and those that do are too bulky for fitness.

In addition, the pockets on most athletic shorts or pants either do not fit a device or are in a fixed position, preventing the user from adjusting the position of the pocket with contents towards the back or inside of the pant to avoid harm to an electronic device from movements such as the deadlift or barbell curl, wherein the user must rest a very heavy load of weight on the hips.

Moreover, these pockets have no protective material and require the user to remove the device to operate it causing sweat and other damaging chemicals to come in contact with the electronic device. The electronic device can easily fall out of the pocket damaging the device, or even cause injury when trying to avoid it with your body or weights if you are setting them on the floor where the electronic device fell. The simple act of setting dumbbells on your hips while preparing to perform a dumbbell bench press will break the electronic device because the pockets are where weights must rest.

Belt Clips:

Next, the belt clips that have been around for decades are not intended for athletic movement. The belt clip positions the electronic device at a poor angle and distance from center of mass in such a way that it is likely to fall off during strenuous physical activity; the simple act of bending at the waist can cause the belt clip to come off of the waist band.

Next, most all belt clips are made of rigid plastic or metal components. This rigid material causes the clip to break when lifting weights or coming in contact with a hard object. The way the clip forces the electronic device to protrude out from the waist leaves the electronic device more vulnerable to coming in contact with an object and breaking or falling off from the momentum it generates.

Finally, you cannot place the belt clip such that it puts the electronic device securely and comfortably inside the pant because the face of the device will be in contact with your hip and could damage the screen or operators, not to mention it will be protruding into the user's hip, bouncing up and down violently with every stride.

Magnetic Pouches and/or Cases:

Furthermore, there are products that use magnets to secure a "pocket" to clothing; however, they are not made for electronic devices, especially ones with "magnetic hard drives" cannot be worn while lifting heavy weights, or strenuous physical activity of any sort. For example, the magnetic clamp on any other product is not reversible, in that you cannot put the pouch on the outside OR inside of your pant because there is either only one magnet, the other piece being simply a magnetic attracting material, or the magnetic clasp would have to fold over the case housing the contents which it cannot connect through, much less reach.

Next, the magnet is in a flap that comes over a panel, which houses the contents, and is not in a secure form-fitting casing. The magnet then rests over the electronic device and/or Credit/ID card while it is in use, thus causing a magnetic hard drive, such as that in the iPod Classic, or the magnetic strip on a Credit/ID card to be destroyed instantly.

In addition, the magnetic "pockets" on the market are not designed to allow the user to orientate the electronic device vertically just below the crease of the hip, which is needed to operate the device while attached and to prevent wedging the contents of the case between your upper thigh and hip. Furthermore, the current magnet pockets on the market are intended to "FIX" the pocket in position; however, the pocket MUST be able to fall by the waist/hip while bending at the hips or else again, it will be wedged between the upper thigh and hip joint, or, if attached towards the back of the users waistband, it would come undone as it's stretched when the user bends at the hip. Moreover, fixing the pocket or pouch to the magnet makes it more difficult to slide from point to point on the waistband or pocket, which is required when going from exercise to exercise.

No Window for Operation of Touch Screen and/or Key Cards:

In addition, neither shorts pockets nor magnetic pockets on the market allow the user to operate the electronic device while active. This is because neither have a clear window for operating the device while inside the pouch, proving the magnetic "pockets" where not designed to be used with today's electronic devices. Thus, the user must remove the electronic device and touch the screen getting sweat, dirt, or other contaminates on the device. These design flaws call for a remedy to the magnet "pockets" on the market that do not address the issues posed to people whom carry their devices while lifting weights or the other functions previously listed. The current products on the market where originally intended for keys, snacks and other knick-knacks; not electronic hand-held devices.

The Fitness Armband:

Finally, the most notorious of all solutions brought forth to people who want to carry their electronic devices on them while performing strenuous physical activity was the armband. The designers of the armband meant well, but they must have never had to lift weights with their invention. The user cannot operate the device while it is attached to their arm. The user cannot, for example, reply to a text, scroll through and find a song, nor operate a fitness application while attached. The position of the armband on the upper arm, is not, by any means, in a position the user can actually operate the device. Even though the device does use a screen, the user must remove the entire device from their arm to operate the device. It is impossible to operate while performing fitness activities. This is a huge problem with the armband. That is to say, a problem with the armband is that it simply does not work.

Most notably, the armband prevents optimal blood flow to the working muscles due to the constriction of the blood vessels. This in turn prevents the blood from optimally carrying oxygen to the muscle fibers; thus, diminishing the body's appropriate function during exercise.

Next, the aforementioned squeezing of the muscles is a futile attempt to secure the armband from falling off is, simply put, very uncomfortable. The variability in arm size is too great to adequately secure the object comfortably. The arm band will often stretch too much and become less elastic, or it will just not stay on the user's desired part of the arm. This can cause injury if and when the device falls off of the user during a heavy set of barbell squats. Most armbands only fit a minority of the population, as such, the people who need it most, if it were to work, weight lifters, cannot even use it because it won't fit their larger than normal upper arm circumference.

Moreover, the Armband acts as a "Tendonitis Splint," preventing the arm from bending, VERY important when performing most all lifting movements. A splint, like the armband, wraps around the muscles and tendons of the arm, preventing the user from full use and range of motion of the arm, thereby limiting the armband's use to nothing more than walking, potentially jogging, but not for a long period of time because it will cut off the user's circulation while the arm is bent.

Finally, even though some have a window to operate the device, you cannot reach the device as it is attached to you upper-arm. You must stop what you are doing and remove the armband to operate the device inside the case. In addition, the way the cord is positioned coming out of the device on the arm is less than optimal for power strength movements; the cord will get wrapped around a weight or body part and cause a great deal of damage to the user or the device.

SUMMARY OF THE INVENTION

Based on the fundamental design flaws of each of the aforementioned current solutions to carrying an electronic device while lifting weights, an exemplary purpose of the present invention is to provide an apparatus for holding, hanging, securing, or wrapping around an electronic or mechanical device. Specifically if the user wants or needs to have the electronic or mechanical device or even a credit card on his person while weightlifting or running, and/or any other physical activity.

Accordingly, it is an exemplary feature of the invention to provide a device that can allow the user to operate it without the user having to remove the device from the protective pouch. The device can also allow the user to reposition the device anywhere on his or her clothing, i.e. the front, back, or side of pants/shorts, and allow the user to secure it to pockets if necessary. The device can be removable but also protect the electronic device it is securing. The casing at the end of the device can be able to secure any model, shape, or size of handheld electronic device. The device can be light weight while reasonably and comfortably contour to the shape of the body part it is up against. The device can be able to connect comfortably whether inside the clothing or outside the clothing. The device can be assembled so as to not damage electronic devices and credit cards or ID cards that are sensitive to magnets. Finally, the device can allow the user to bend at the hips without causing pressure on the electronic device or falling off.

The lack of an adequate solution for safely carrying an electronic device makes performing basic physiological movements naturally and correctly with or without weights impossible. The present invention is a much needed solution to this most frustrating problem for anyone who has ever tried to lift weights while listening to their favorite music, operating their device and/or applications on their device, or simply carrying a credit card so as to not have it stolen out of a gym bag.

According to one exemplary embodiment of the invention, a holding device includes a lanyard that attaches to the clothing with magnetic material and holds an electronic device is presented. The present invention includes a pouch that includes a window for operation or to view contents, and an opening positioned to allow contents to be inserted into the pouch. The present invention also includes a strap extending out passed the pouch with a magnet near one end of the strap and another magnet near the opposite end. The magnets are such that they will attract and clasp on both sides. The top of the strap can fold to either side and still connect to the magnet below in the same way.

The present invention solves the previously-addressed exemplary design flaws of current products on the market. The present invention can be made out of a form fitting material that will fit most every make and model electronic device. The material will allow the user to operate the buttons of the device without having to look at the device or remove it from the case. There is a clear window on the surface so the user can operate the functions of the screen or front of the device with his or her fingers, but not have to remove the contents from the case. The case has a lanyard that extends upward with a magnetic piece at the end, and another magnetic piece on the opposite end. When the user places the lanyard on the clothing the magnets will connect below the waistband, with the clothing material in between the magnets, leaving the electronic device to fall below the magnets and crease of the hip, preventing damage to the electronic device from the magnets and damage from the pressure of being caught between the upper thigh and hip. The case or pouch can either go inside or outside of the pant/shorts. The magnets will connect on either side of each other. The case will sit at a comfortable height, and form to the contour of the body. The present invention is light, and somewhat unnoticeable. If the user needs, he or she can slide the lanyard clasp around the waistband to avoid contact with the weight or object the user is about to move. The present invention can be made of any form fitting or molded protective fabric. The casing can include an optional mesh "pouch" attached with an elastic band for carrying other misc. items.

The present invention, used for holding or hanging an electronic device, is a very easy-to-use device. Basically, the device is made to be able to carry an electronic device, i.e., smart phone, mp3 player, insulin pump, etc. hands free, at the gym, going for a run, (cycling, skiing, yard work, and motorsports), basically anything where one needs their hands, and/or are physically active. The present invention could even be used to carry a device to a sporting event or county fair. As previously stated, each alternative on the market today is not suitable for the myriad of things people do on a daily basis. Weight lifting is used as an example because weight lifting is the inspiration for this device. For the last ten years the inventor has been going to the gym, and has broken two iPods®, countless pairs of head phones, an HTC smart phone, and finally a new iPhone 5®. The inventor had tried everything on the market for taking his devices with him to the weight room so he could listen to his favorite music. A lot of people claim their music to be their best workout partner because music has been proven to increase the strength and endurance in a workout immensely. The problem, again, none of these products worked, they either put the electronic device at risk, and therefore broke it eventually, or the product did not allow the inventor to move their body and/or lift the weight with proper form without putting a great deal of stress on the electronic device that it either came free and fell or got crushed. The inventor would have to compromise their form to account for the phone holder being in an inappropriate position, and he could not adjust it. The inventor finally got upset enough that he did what most gym goers do, and that is to simply put it in their pocket. However, the inventor only had so many shorts and pants with pockets for working out, many do not have pockets, and therefore the inventor had to constantly wash the few shorts and pants he had that did have pockets or else he could not or would not lift because he did not have a music player. Moreover, the inventor could not change the song, look at a text, or check the time unless he took the phone out of his pocket, thereby resulting in getting sweat all over the electronic device.

Advantageous Effects of Invention

In addition to solving all of the exemplary problems listed above, the invention presented to you is solving all of those problems within, for example, one single embodiment. The exemplary solution can allow the user to carry any electronic device, including insulin pumps, iPod Classics®, and even Credit Cards safely without destroying them. Most importantly, this solution can allow the user to finally carry these products on their person while engaging in most any fitness activity, up to and including power lifting, marathon running, and even swimming if also encased with a water-proof hard case. The design deficiencies of previous products, such as crushing the device with heavy weights, having the device fall out of the user's pocket, or soak the device in sweat while trying to check the time, change a song, operate an app, etc., can be solved with the exemplary design of the present invention.

The present invention can allow the user to operate the device while attached and protected from sweat and dirt. One can even mow the lawn in the hot Texas summer heat without getting dirt and sweat all over one's electronic device, and never have to worry with the impossibility of stuffing the ever larger smart phones into a relatively small pants pocket.

On a much greater scale, the present invention can allow diabetics to finally experience the freedom of taking part in whatever type of work out he or she wants. He or she is no longer chained to his or her insulin pump, only able to remove it for 30 minutes because he or she cannot perform dead lifts or power cleans while their insulin pump is attached with a hard, immovable, plastic, protruding holster; one that will fly off as soon as he or she bends at the hips. The invention being submitted will not harm an insulin pump just as it will not harm any other electronic device because the magnetic clasp is above the casing. This invention is freedom for those of us that have been frustrated to the point of giving up for the better part of the last decade.

DETAILED DESCRIPTION OF THE EXEMPLARY EMBODIMENTS

All illustrations of the drawings are for the purpose of describing selected versions of the present invention and are not intended to limit the scope of the present invention.

Figure 1:
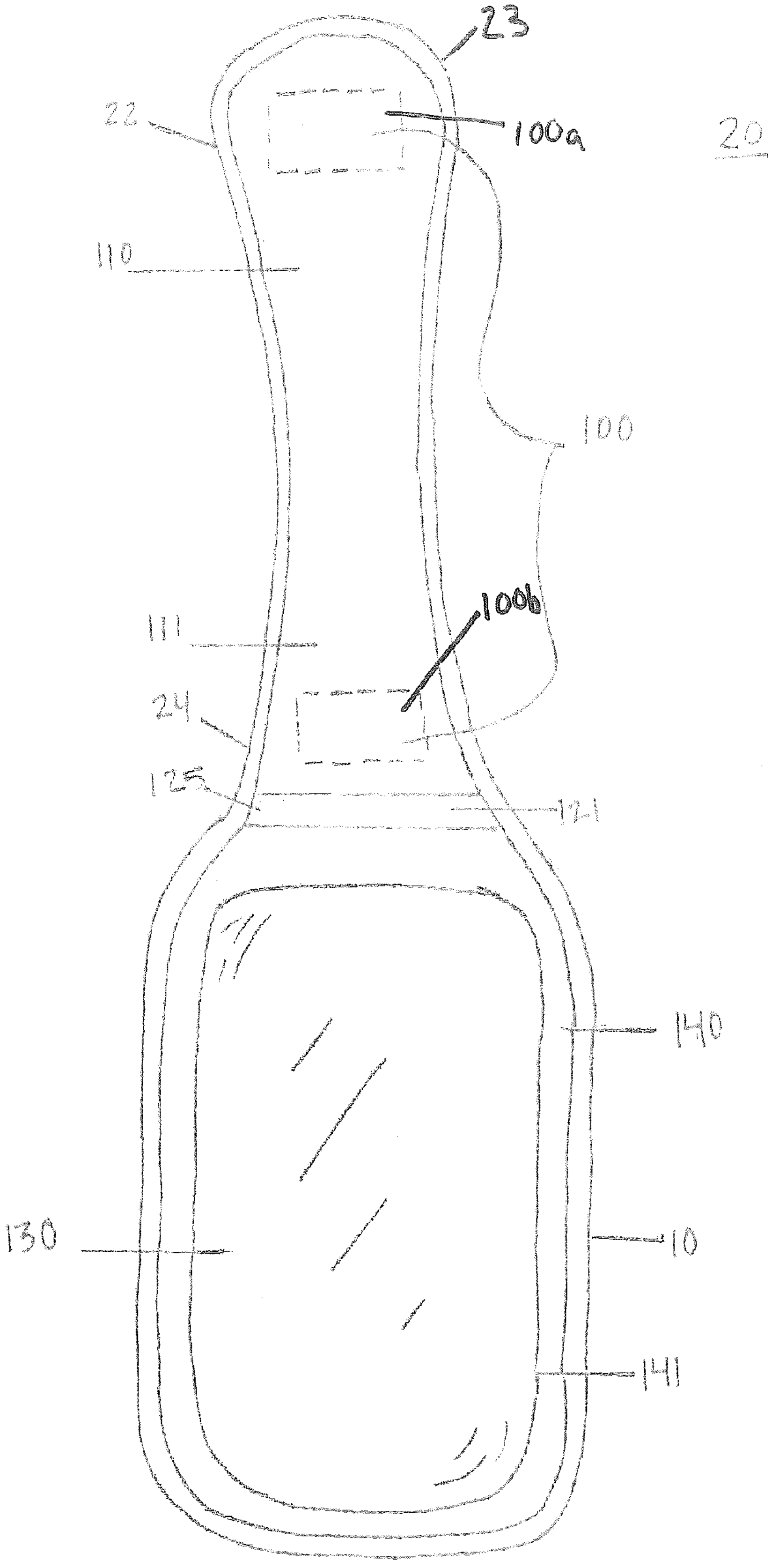
FIG. 1 illustrates an exemplary embodiment of the present invention and specifically a face/screen up, open clasp, unattached view of device.
Figure 2:
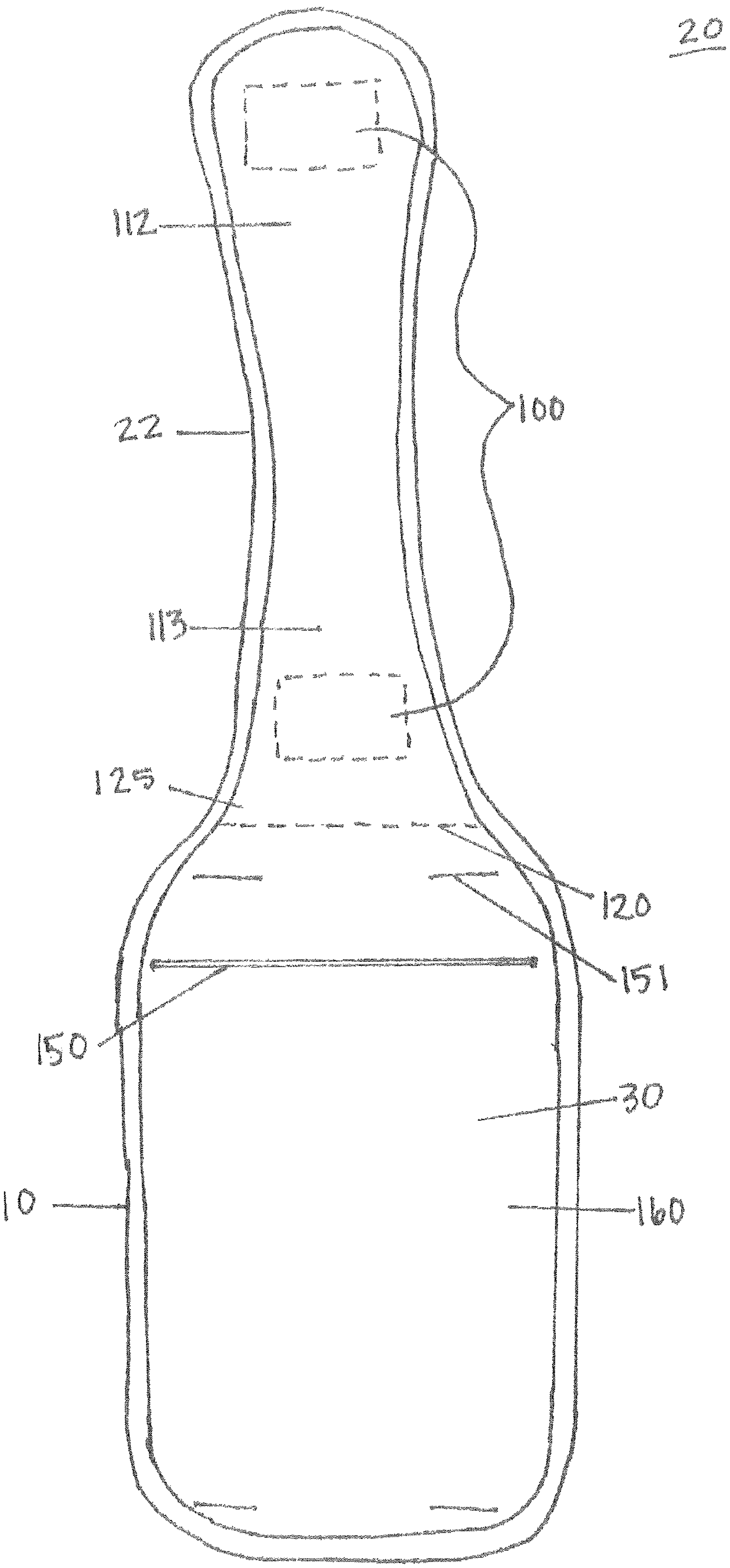
FIG. 2 is another view of the exemplary embodiment of the present invention and specifically a face/screen down, open clasp, unattached view of device.

In an exemplary embodiment and as shown in FIGS. 1 and 2, the present invention includes a lanyard 20 having a case 10 and a strap 22 either separately or integrally formed and can be made out of simple form fitting material, for example, neoprene, but any material that will secure an electronic device (item) 170 can be used. A connecting region 125 is formed of the material between a proximal end of the strap 24 and the casing 10 for securing the strap 22 to the casing 10.

The pouch preferably will have dimensions (form factor) such that the electronic device 170 will fit snug into a pouch 30 formed in the case, thereby to allow the user to feel for and press the buttons if the user should want to.

Next, the pouch 30 can either have a clear, protective cover/window (screen) 130 over the screen or one side of the case, such that the user can operate the device without having to remove the electrical device with his or her hand and get sweat and dirt, or any other contaminate on the electronic device. However, the window could also be a cut out, just to allow for operation for more casual use.

The other side 160 of the pouch/case 10/30 has an incision (opening) 150 which will allow the electrical device to be inserted into the pouch 30 and removed therefrom, all the while securing the device while in use.

Next, the lanyard 20 extends past one end of the pouch 30 such that it is approximately between the lengths of the pouch 30 and could extend another half length of the pouch 30. The strap 22 can either be sewn on separately, or it can be part of/an extension of the case 10. The strap 22 may include two sheets, or one sheet with the ends coupled onto each other to secure the magnets 100 that include a first magnet 100*a* and a second magnet 100*b*.

Strap 22 preferably has at least one magnet 100*a* on one end of it and a second magnet 100*b* on an other end such that the first and second magnets 100 come together above the phone. Thus, the first and second magnets 100 come together (i.e., are positioned) such that they do not disrupt the magnetic hard drive of some mp3 player models, and in addition, will allow enough movement to prevent excess stress on the electronic device and/or lanyard. The connecting region 125 separates the magnets from the electronic device 170 so as not to damage any magnetic sensitive item in the pouch 30.

The magnets 100 will allow for the electronic device to be placed inside the pant leg or outside the pant leg. For example, the magnets 100 are +/−charges (i.e., have a magnetic orientation) and when a distal end of the lanyard 20 is flipped to the other side will be −/+, thus keeping the magnetic attraction intact.

Once the user places the first magnet 100 on the outside of the pant and the second magnet 100 on the inside, the magnets 100 will both fall to the sides of the pant attracted to each other and coming together. The user will be able to remove, adjust, reposition, or slide the device front, back, to the side, inside, and outside the waist band. The user will be able to connect the device to a pocket if he or she wants to, i.e. placing the electronic device in the cargo pocket of a pant leg, and connecting the magnets 100 to the seam of the cargo pockets.

Figure 3:
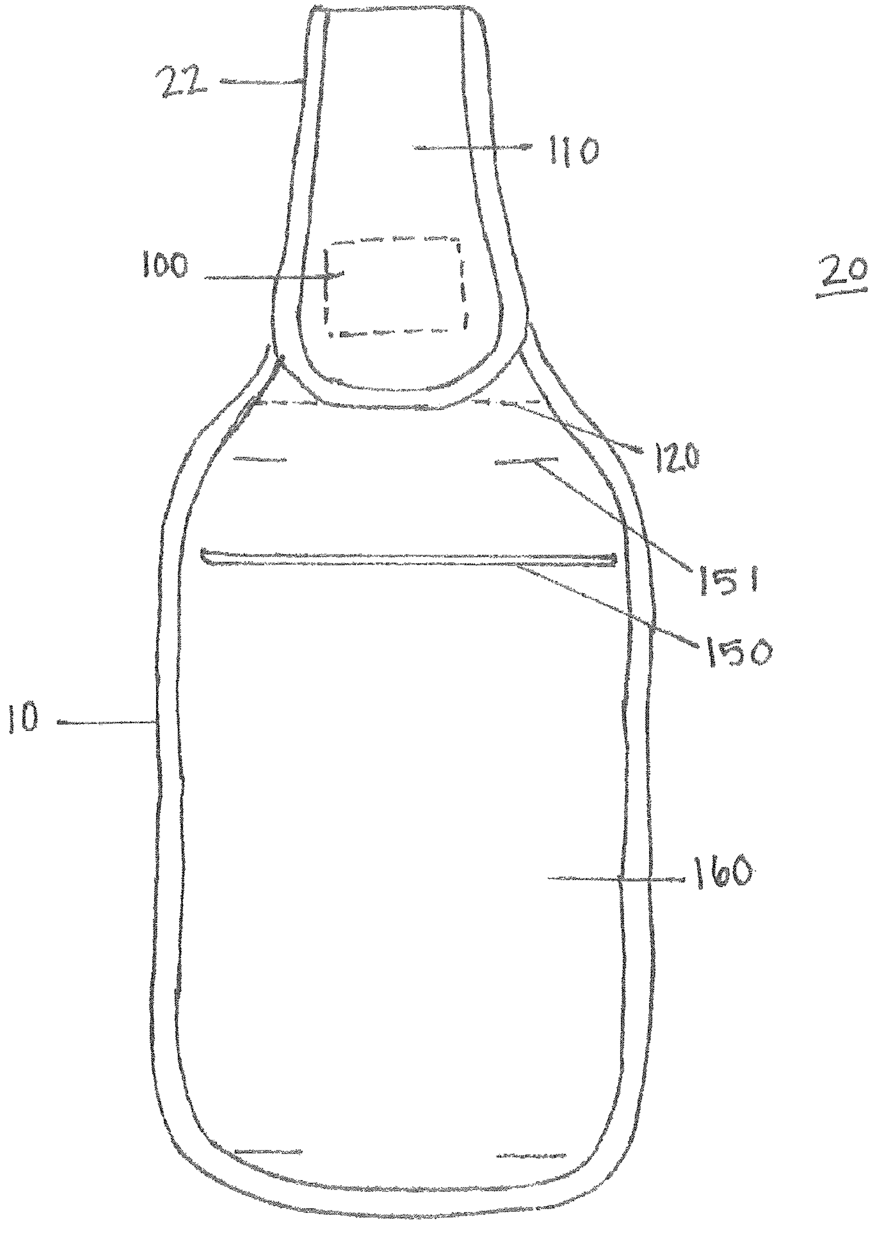
FIG. 3 illustrates yet another view of the exemplary embodiment of the present invention in which a lanyard is folded along waistband with an upper portion folded into the pant/shorts, a pouch with an electronic device is hanging outside of pant/shorts, a screen/window is facing out, and a back of the pouch is flush against pant/shorts.

FIG. 3 shows lanyard 20 which is folded along the waistband with an upper portion folded into the pant/shorts, the pouch with the electronic device hanging outside of the pant/shorts, the screen/window facing out, and a back of the pouch which is flush against the pant/shorts.

The fact that the user is able to easily slide or simply detach the magnets 100 to move the electronic device to a different position will allow the user to position the electronic device out of harm's way from the heavy weights.

For example, if the user is doing heavy front deadlifts, or barbell curls, the user must rest the barbell on his or her hips for a small amount of time, they may even bounce the weight off of their hips. However, if the electronic device is in the front or side pocket, it will be crushed by the weight. In addition, if the user is setting the dumbbells on his or her hips to begin a dumbbell bench press, the user may accidentally crush the electronic device with the dumbbells if the electronic is in the front pocket. Moreover, if the device is in the front pocket, it could fall out, forcing the user to worry about crushing it when he or she sets the weights down. The user can simply reposition the magnets 100 such that they are not in the way, and it will still be secure to their person.

The lanyard 20, with magnets 100, is washable, so the user can simply wash the device after use to keep it clean.

If the user would like to run with the electronic device, the user can simply place the electronic device on the inside of the pants or shorts and it will be even more secure. The short lanyard, choking up on the electronic device, and the wide lanyard will prevent excess movement of the electronic device when the user is moving quickly.

The pouch/case 10 will be positioned just at or below the crease in the hip such that the user will be able to bend at the waist without the electronic device getting caught between the upper thigh and the hip muscles and bones. This will prevent undue stress and pressure on the electronic device and make it much more comfortable to the user. The bottom magnet is preferably not positioned at the bottom of the pouch because it could ruin some devices with magnetic hard drives, and it will not compress like the pant/shorts will when the user bends at the waist, thus forcing the electronic device to protrude out and/or get crushed.

Figure 4:
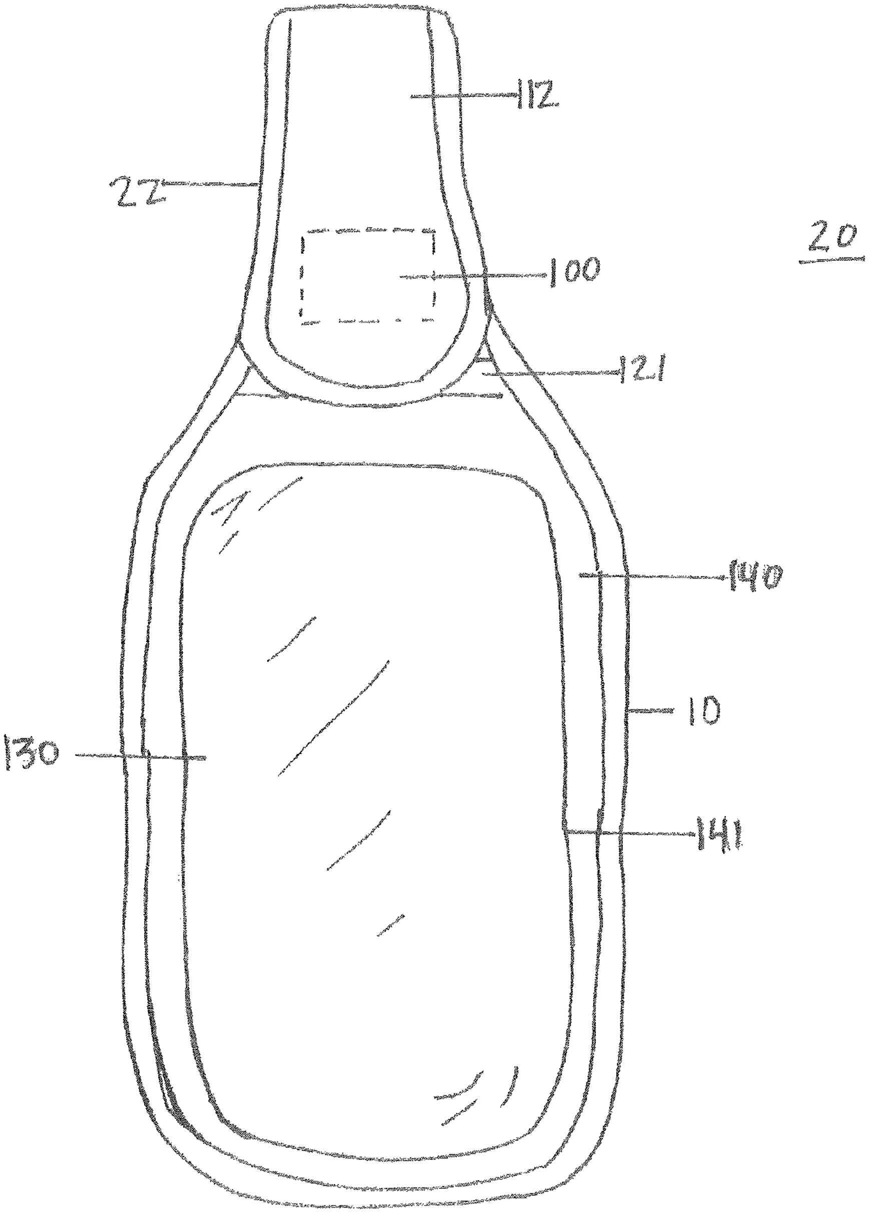
FIG. 4 illustrates yet another view of the exemplary embodiment of the present invention in which a lanyard is folded along a waistband, an upper portion of the lanyard is folded over outside of pant/shorts, the pouch with the electronic device is concealed inside the pant/shorts, and a screen/window is flush against an inside portion of the pant/shorts.

FIG. 4 shows the lanyard 20 folded along a waistband, an upper portion of the lanyard is folded over outside of pant/shorts, the pouch 30 with the electronic device is concealed inside the pant/shorts, and the screen/window is flush against an inside portion of the pant/shorts.

Figure 5:
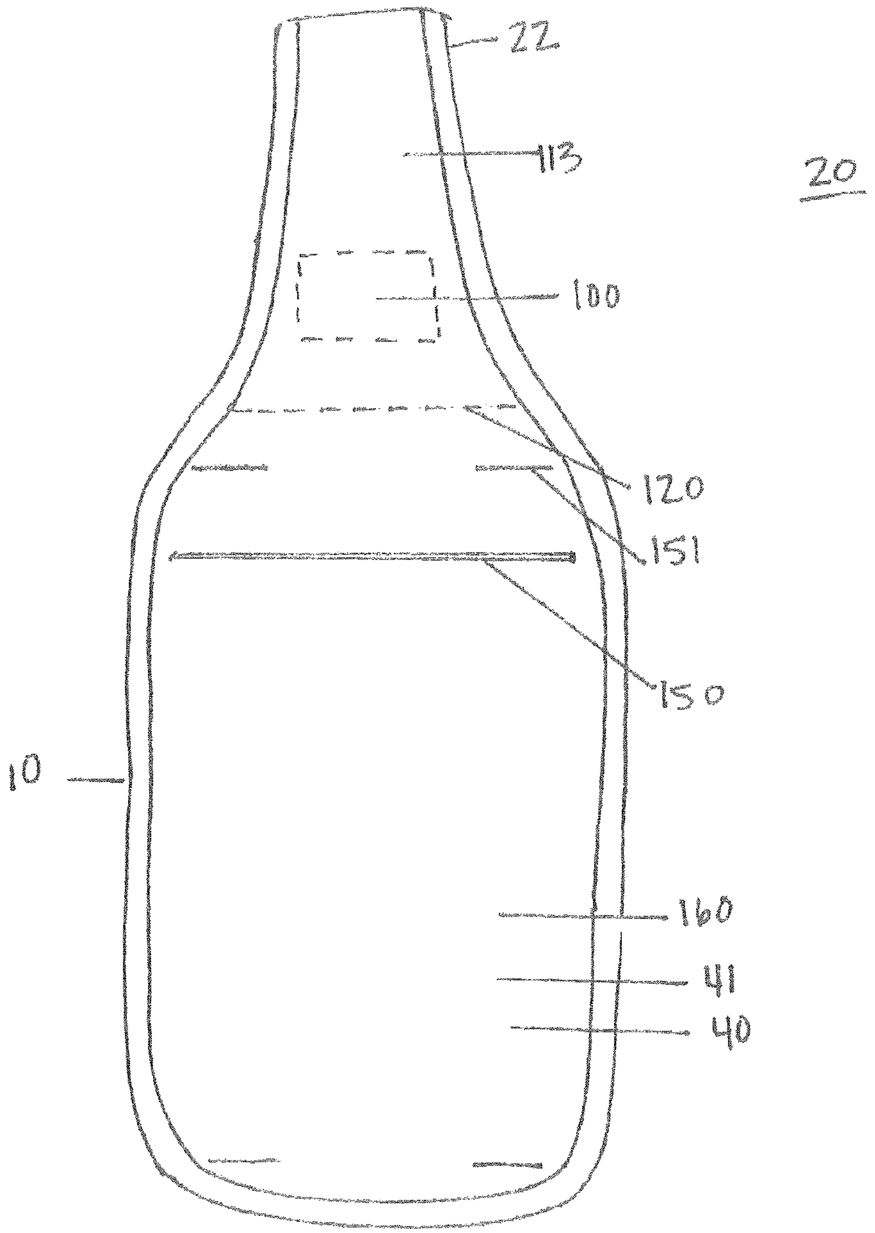
FIG. 5 illustrates a back side view of the inside pant/shorts option from FIG. 4.

FIG. 5 illustrates a back side view of the inside pant/shorts option from FIG. 4.

Figure 6:
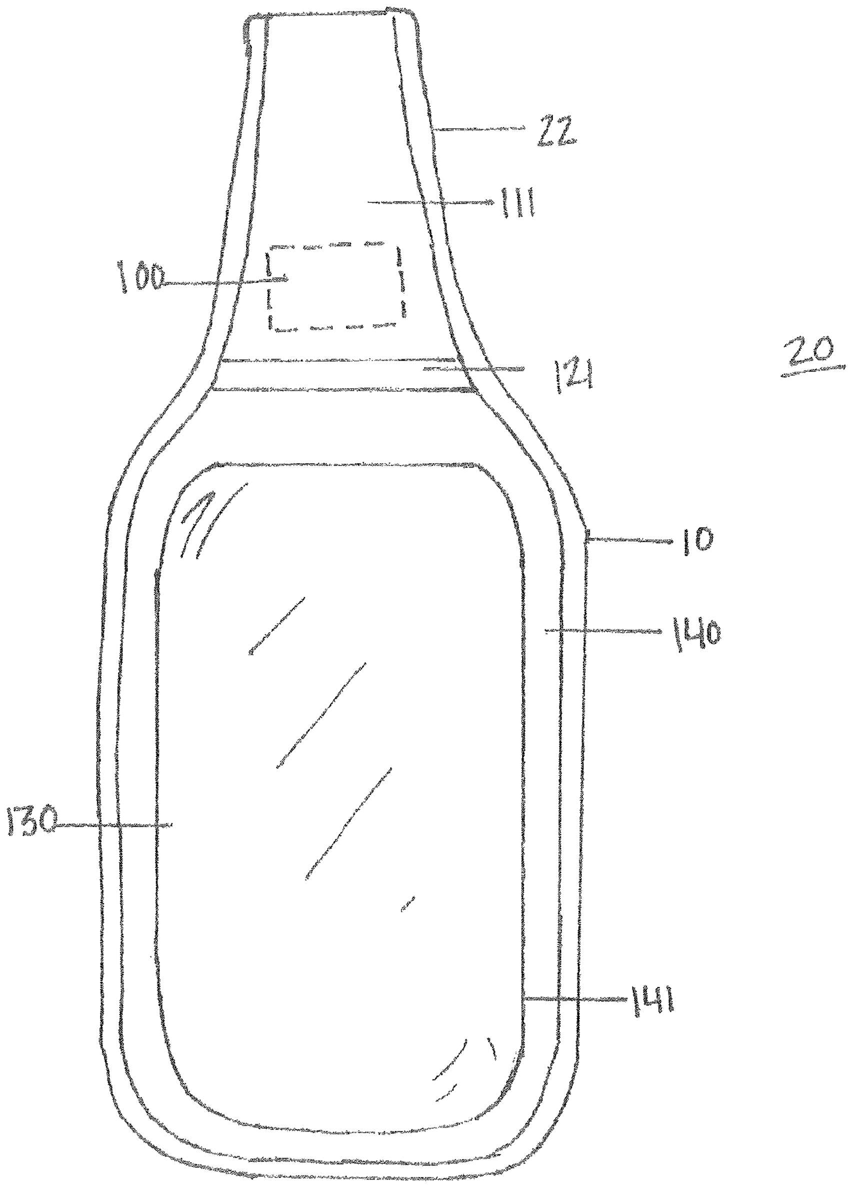
FIG. 6 illustrates an outside the pant/shorts view of a top part of the lanyard folded into the pant/shorts, and is an outside view of FIG. 3.

FIG. 6 illustrates an outside the pant/shorts view of a top part of the lanyard folded into the pant/shorts, and is an outside view of FIG. 3.

The lanyard 20 makes the entire device able to contour to the user's hips. The device will lie comfortably on the hips of the user.

The pouch 30 is positioned on the lanyard such that the user, whether the electronic device 170 is inside or outside the pant or shorts, to be able to lift the electronic device 170 up to view the screen and it will be upright for the user to view the screen as the user would hold it out of the case 10. Thus, the user can drop the case 10 and pick it back up and the electronic devices 170 face will be upright and towards the user whether it is inside the pant/shorts or outside.

The strap 22, when clasped (i.e., the first magnet contacts the second magnet), forms a loop 126 above the casing 10 and the connecting region 125. Preferably, it does not go over any portion of the casing 10, and therefore will not have an effect on any magnetically sensitive contents inside casing, thereby also allowing the casing to move free from the fixed clasp, unique to all over inventions.

The case 10 is not fixed at one end, thereby to allow the casing to move freely during activity, and not be secured in one position other than that of the clasp above.

The strap 22 is flexible in a direction towards the front panel 140 and a direction towards the back panel 160. The reversible nature of the strap 22, due to the fact it is above and separate from the casing 10 allows the user to fold the strap 22 in either direction, thus allowing the user to place it on the inside of his or her pant leg for running or jumping movements outside of weight lifting.

Figure 7:
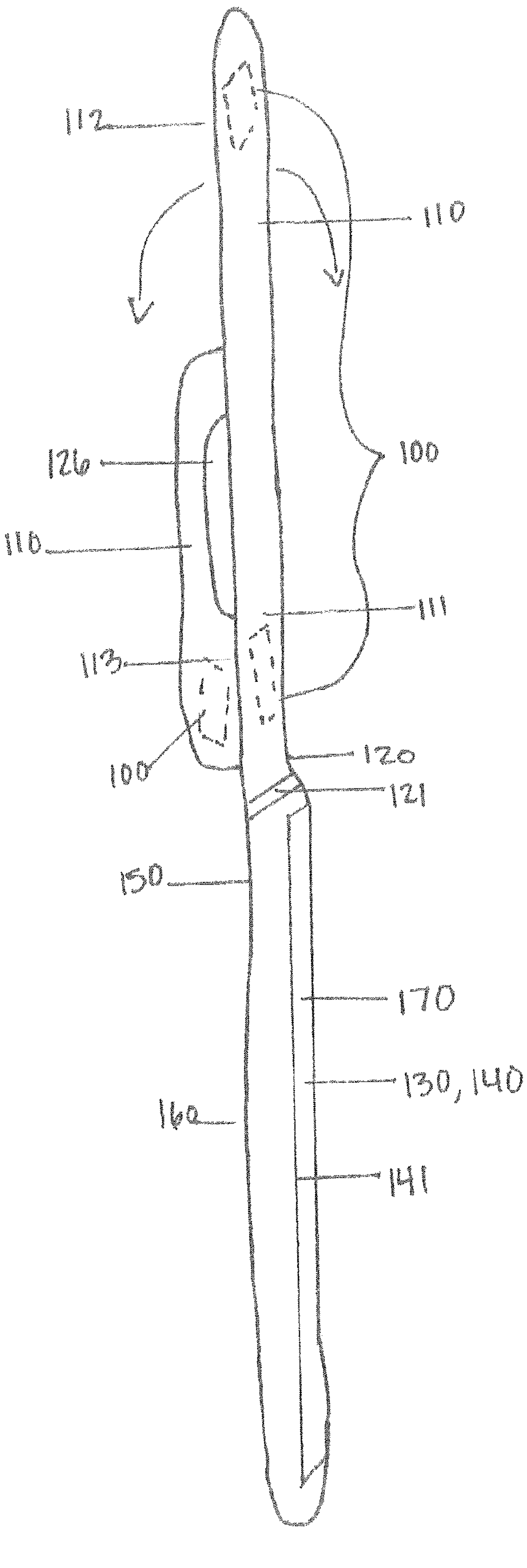
FIG. 7 is a side view of the lanyard and pouch, showing the lanyard in the fully extended position and the folded position and in which the arrows from the upper fold indicate that the magnets will attract either way it is folded.

FIG. 7 is a side view of the lanyard and pouch, showing the lanyard in the fully extended position and the folded position and in which the arrows from the upper fold indicate that the magnets will attract either way it is folded.

The case 10 may also include a second pouch 40 on backside with elastic band coupled to back side of "Casing" to hold additional contents such as money, keys, and/or cards. The pouch may be formed by attaching (for example, by sewing) a third panel 41 to the back panel 160.

A border 141 which surrounds the screen can include a reflective material. Or, a reflector can be disposed around the clear protective window on front side, to add a level of security while in use during dark hours.

The case 10 may be formed of the back side panel 160 and a front side panel 140 being attached around edges thereof. The front side panel 140 and back side panel 160 are sewn all the way around the case 10. In other words, an entirety of an edge of the back side panel is coupled to an entirety of an edge of the front side panel.

The present invention may further include a plurality of straps attached to the case. Further, the present invention may orient the case sideways.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

Further, Applicant's intent is to encompass the equivalents of all claim elements, and no amendment to any claim of the present application should be construed as a disclaimer of any interest in or right to an equivalent of any element or feature of the amended claim.

REFERENCE NUMERALS

10—A case
20—A Lanyard
21—A distal end of the Lanyard
22—A strap
23—A distal end of the strap
24—A proximal end of the strap
30—A pouch
40—A second pouch
41—A third panel
100—First and second magnets embedded between two pieces of fabric.
110—Upper screen side part of flap.
111—Lower screen side part of flap.
112—Upper back side part of flap.
113—Lower back side part of flap.
120—Seam of lanyard. Either sewn or a continuation of the pouch fabric.
121—Example without seam, all one piece of material.
125—Connecting region
126—A loop
130—Screen/Window to view/operate electronic device
140—Pouch material framing and attached to the screen/window material, front panel
141—Reflective border for wearing at night.
150—Opening of back of pouch for sliding electrical device into.
151—Headphone-Jack holes to feed cord through on all four corners to fit any model phone.
160—Back of pouch, form fitting, protective fabric, back panel.
170—Electronic Device

What is claimed is:

1. A device for securing and protecting an item, comprising:
- a single non-connected strap comprising a flexible material including:
  - a first magnet disposed directly on a distal end of the strap; and
  - a second magnet disposed directly on a proximal end of the strap and on a same surface of the strap as the first magnet,
- a casing for securing and protecting the item including:
  - a pouch formed in the case having an opening;
  - a screen disposed on a front side of the casing for viewing the item inside the casing; and
  - a border disposed between an edge of a mesh pocket and the screen that surrounds an entirety of the screen, the border comprising a first material different from a material of the screen and the flexible material of the strap,
- a connecting region disposed between the proximal end of the strap and the casing for securing the strap to the casing so as to separate the first magnet and the second magnet from the casing;
- a second border entirely and continuously surrounding the strap, the connecting region, and the casing such that an entirety of an edge of the back side panel is coupled to an entirety of an edge of the front side panel; and
- a plurality of holes in the casing for inserting an object to associate with the item,
- wherein the border being disposed between the screen and the second border,
- wherein the second border comprises the flexible material,
- wherein the first magnet and the second magnet are disposed above the connecting region,
- wherein the strap is configured to fold in a direction towards the back side of the casing or towards the front side of the casing such that the first magnet contacts the second magnet.

2. The device according to claim 1, wherein a loop is formed when the strap is folded and clasped such that the first magnet is magnetically connected to the second magnet.

3. The device according to claim 1, wherein the strap is configured to fold such that the first magnet contacts the second magnet.

4. The device according to claim 1, wherein the strap is folded and clasped via the first magnet and the second magnet above the connecting region so as to avoid contact with the item.

5. The device according to claim 1, wherein the casing comprises a back side panel and a front side panel,
- wherein the opening of the pouch is disposed near an upper portion of the back side panel.

6. The device according to claim 1, wherein a size of the screen is configured to match a size of a screen of the item.

7. The device according to claim 1, wherein a length of the strap is set such that a loop is formed when the strap is folded such that the first magnet contacts the second magnet.

8. The device according to claim 1, further comprising a third panel which is attached to the back side of the casing so as to form a back side pocket.

9. The device according to claim 1, wherein the first material of the border comprises a reflective material.

10. The device according to claim 1, wherein the first magnet and the second magnet are disposed on a first side of the connecting region,
- wherein the case is disposed on a second side of the connecting region.

11. A lanyard for securing and protecting an item, comprising:
- a single non-connected strap including:
  - a first magnet disposed directly on a distal end of the strap; and
  - a magnetically attracting material disposed directly on a proximal end of the strap and on a same surface of the strap as the first magnet,
- a casing for securing and protecting the item including:
  - a mesh pocket having an opening;
  - a screen disposed on a front side of the casing for viewing the item inside the casing; and
  - a border that surrounds an entirety of the screen, the border comprising a first material different from a material of the screen and the flexible material of the strap,
- a connecting region disposed between the proximal end of the strap and the casing for securing the strap to the casing so as to separate the first magnet and the magnetically attracting material from the casing;
- a second border entirely and continuously surrounding the strap, the connecting region, and the casing such that an entirety of an edge of the back side panel is coupled to an entirety of an edge of the front side panel; and
- a plurality of holes in the casing for inserting an object to associate with the item,
- wherein the border being disposed between the screen and the second border,
- wherein the second border comprises the flexible material, wherein the first magnet and the magnetically attracting material are disposed above the connecting region, and wherein the strap is configured to fold in a direction towards the back side of the casing or towards the front side of the casing such that the first magnet contacts the second magnet.

12. A lanyard for securing and protecting an item, comprising:

a single non-connected strap comprising a flexible material including:

a first magnet disposed directly on a distal end of the strap; and a second magnet disposed directly on a proximal end of the strap and on a same surface of the strap as the first magnet, a casing for securing and protecting the item including:

a mesh pocket having an opening;

a screen disposed on a front side of the casing for viewing the item inside the casing; and a border disposed between an edge of the mesh pocket and the screen that surrounds an entirety of the screen, the border comprising a first material different from a material of the screen and the flexible material of the strap, a connecting region disposed between the proximal end of the strap and a top end of the casing for securing the strap to the casing so as to separate the first magnet and the second magnet from the casing;

a second border entirely and continuously surrounding the strap, the connecting region, and the casing such that an entirety of an edge of the back side panel is coupled to an entirety of an edge of the front side panel; and a plurality of holes in the casing for inserting an object to associate with the item, wherein the border being disposed between the screen and the second border, wherein the second border comprises the flexible material, wherein the strap is disposed above the casing and connecting region such that the casing hangs from the strap via the connecting region, and wherein the strap is configured to fold in a direction towards the back side of the casing or towards the front side of the casing such that the first magnet contacts the second magnet.

* * * * *